United States Patent
Chen

Patent Number: 5,957,595
Date of Patent: Sep. 28, 1999

[54] MULTIMEDIA KEYBOARD DEVICE HAVING GAME RODS ON EACH END

[76] Inventor: Kuo-An Chen, 4F, No. 11, Alley 4, Lane 95, Yu-Hsi St., Yung-Ho, Taipei Hsien, Taiwan

[21] Appl. No.: 09/000,615

[22] Filed: Dec. 30, 1997

[51] Int. Cl.⁶ .................................................. G09G 5/08
[52] U.S. Cl. .................... 400/472; 400/489; 361/680; 341/22; 345/161; 345/163; 345/167; 345/169
[58] Field of Search .................. 400/472, 489, 400/682; 361/680, 681; 345/161, 163, 167, 168, 169; 248/444; 108/43; 341/21, 22, 23

[56] References Cited

U.S. PATENT DOCUMENTS

| | | | |
|---|---|---|---|
| 3,884,342 | 5/1975 | Mulholland | 197/186 R |
| 4,518,164 | 5/1985 | Hayford, Jr. | 108/43 |
| 4,949,080 | 8/1990 | Mikan | 361/680 |
| 5,029,260 | 7/1991 | Rollason | 400/489 |
| 5,034,574 | 7/1991 | Martovitz | 345/161 |
| 5,302,970 | 4/1994 | Lakso et al. | 345/168 |
| 5,410,333 | 4/1995 | Conway | 345/168 |
| 5,613,223 | 3/1997 | Ross et al. | 455/89 |
| 5,615,083 | 3/1997 | Burnett | 361/680 |
| 5,621,436 | 4/1997 | Solhjell | 345/167 |
| 5,675,360 | 10/1997 | Takegoshi et al. | 345/167 |
| 5,677,709 | 10/1997 | Miura et al. | 345/161 |
| 5,732,910 | 3/1998 | Martin | 108/43 |
| 5,737,107 | 4/1998 | Umeda | 359/146 |
| 5,757,354 | 5/1998 | Kawamura | 345/126 |
| 5,815,109 | 9/1998 | Tan | 341/22 |
| 5,825,612 | 10/1998 | Aubuchon et al. | 361/680 |

*Primary Examiner*—Edgar Burr
*Assistant Examiner*—Leslie J. Grohusky
*Attorney, Agent, or Firm*—Rosenberg, Klein & Bilker

[57] ABSTRACT

A type of multimedia keyboard device, designed with two positioning depressions at the bottom of casing of a keyboard device, between said two positioning depressions is the formation of a separating unit, said positioning depressions and separating unit will be properly positioned between the user's thighs and on his lap, on one side or two sides of the casing is the design of a handgrip, at somewhere suitable for operation on the left and two sides of the casing is the design of press keys; so designed that it will be suitable especially for applications to wireless remote control keyboard, and will achieve such purposes that the keyboard may be positioned on the user's lap, may be held in both hands and its keys may be conveniently pressed.

1 Claim, 6 Drawing Sheets

MULTIMEDIA KEYBOARD DEVICE HAVING GAME RODS ON EACH END

BACKGROUND OF THE INVENTION

The subject matter relates to a type of multimedia keyboard device, particularly to one that is used on a wireless control keyboard, and that may be placed on a user's lap or held in the user's hands in operation.

The rapid development of multimedia keyboard has made it become a routine item in our daily life. Since a multimedia keyboard is compatible with a game rod or a mouse or other input devices which are operated by wireless remote control, its applications are not limited on the desktop, and the user may place the multimedia keyboard on his lap or hold it in both hands. However, the bottom of the casing of conventional types of multimedia keyboard has been designed to have a flat surface, so the keyboard cannot be properly positioned on the user's lap, the operation could not be so convenient. Furthermore, though the two sides of the casing of conventional multimedia keyboard can be held by the user, the holding area is too limited to facilitate handheld operation. Moreover, the game rod or mouse key for a conventional multimedia keyboard is located at the top of the casing, so the user can only press the key with his thumb when he is holding the keyboard, instead of using his index finger or middle finger to press said keys.

SUMMARY OF THE INVENTION

The primary objective of the subject matter is to present a type of multimedia keyboard device, involving the design of two positioning depressions at the bottom of the casing of the keyboard device, between the two positioning depressions is the formation of a separating unit, said positioning depressions and separating unit can be properly positioned between the user's thighs and on his lap, so the keyboard device will rest steadily on the user's lap, to facilitate operation. Easy operation is especially possible to the application with wireless remote control unit.

Another objective of the subject matter is to present a type of multimedia keyboard device, on one side or two sides of the casing of the keyboard device is the design of a handgrip to facilitate the user's steady handheld operation and portability.

Yet another objective of the subject matter is to present a type of multimedia keyboard device, with the design of press keys in an area suitable for operation at the left and right sides of the rear edge on the bottom of casing of the keyboard device, so that the user may easily press said two keys with his index finger or middle finger when he is holding onto two sides of the casing.

To enable better understanding of the characteristics and technical contents of the subject matter, please refer to the following detailed description with drawings; however, the attached drawings are only for the purposes of reference and description, which shall not be based to restrict or limit the subject matter:

BRIEF DESCRIPTION OF NUMERALS

| 10 | keyboard device | 11 | casing |
|----|-----------------|----|--------|
| 12 | top casing | 13 | bottom casing |
| 14 | keyboard | 15 | function key |
| 16 | game rod (mouse) | 17 | wireless remote control |
| 18 | positioning depression | 19 | separating unit |
| 20 | handle | 21 | gripping depression |
| 22 | press key | 23 | press key |

DETAILED DESCRIPTION OF PREFERRED EMBODIMENT

Figure 1:
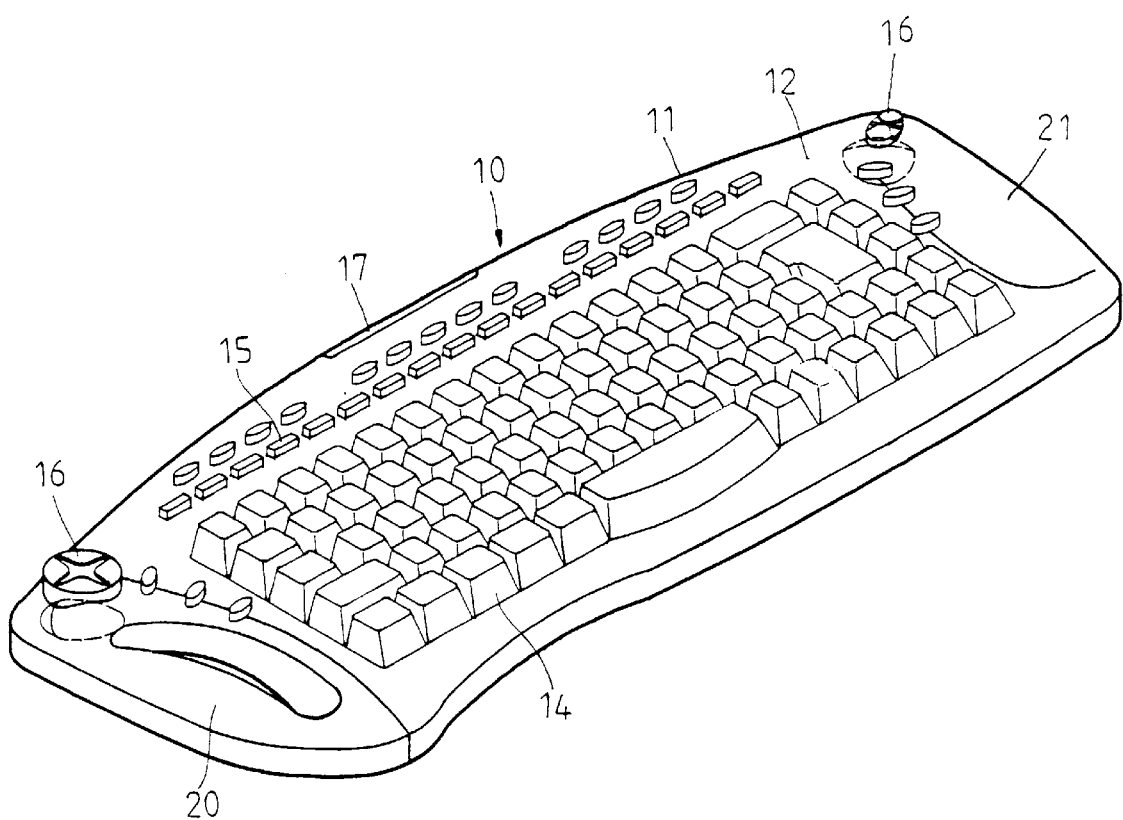
FIG. 1 is a perspective view of the subject matter.
Figure 2:
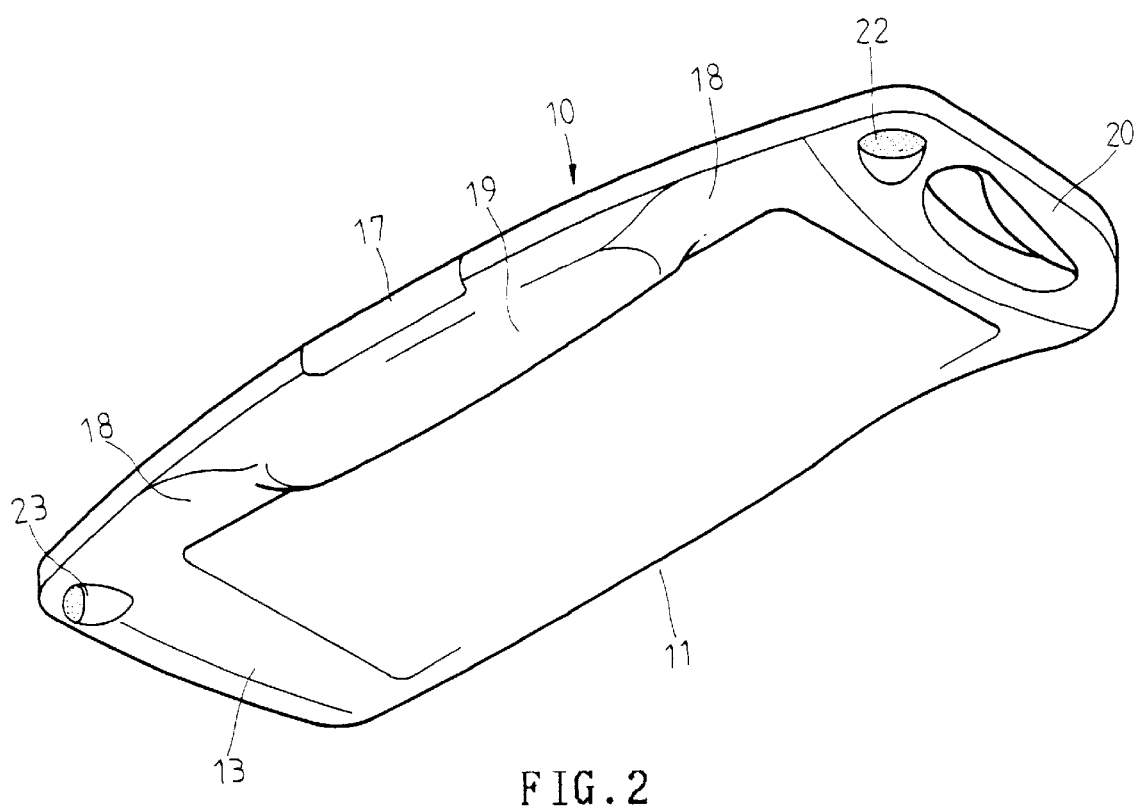
FIG. 2 is a perspective view of the subject matter from another angle.

As illustrated in FIGS. 1 and 2, the subject matter relates to the presentation of a multimedia keyboard device, particularly to one applicable to wireless remote control, the casing 11 of said keyboard device 10 is similar to a conventional construction, comprising of a top casing 12 and a bottom casing 13, on top of the casing 11 are a certain number of press keys 14, on the casing 11 beyond the press keys 14 are special function keys 15, on the casing 11 at the right and left sides of the press keys 14 is the installation of game rods (or mouse) 16, at the rear of the casing 11 is a wireless remote control 17, it will be able to transmit signals without actually being connected to the computer, there is a wiring circuit inside the casing 11 (not shown in drawing), since said keyboard device is roughly of the same construction as conventional models, which is not included in the subject claim, it requires no elaboration.

Figure 3:
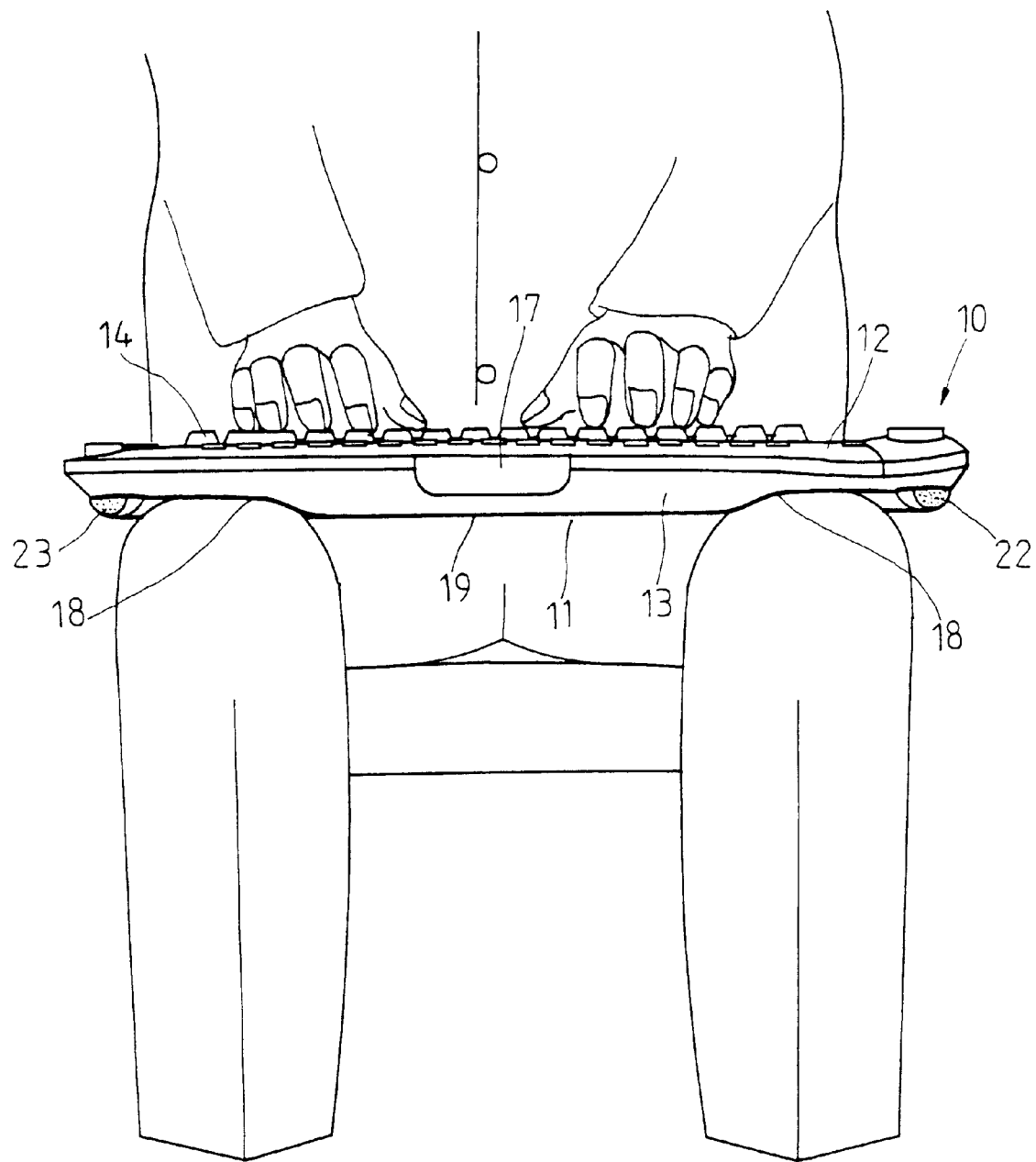
FIG. 3 is an illustration of the subject matter when placed on the user's lap.

In the subject matter, there are two positioning depressions 18 at the bottom of the casing 11, and a separating unit 19 between the two positioning depressions 18, the arc of said positioning depressions 18 is designed according to human ergonomics, the two positioning depressions 18 and the separating unit 19 can be positioned on a user's lap, so the keyboard device 10 can be steadily positioned on a user's lap (as shown in FIG. 3), to facilitate operation.

Figure 4:
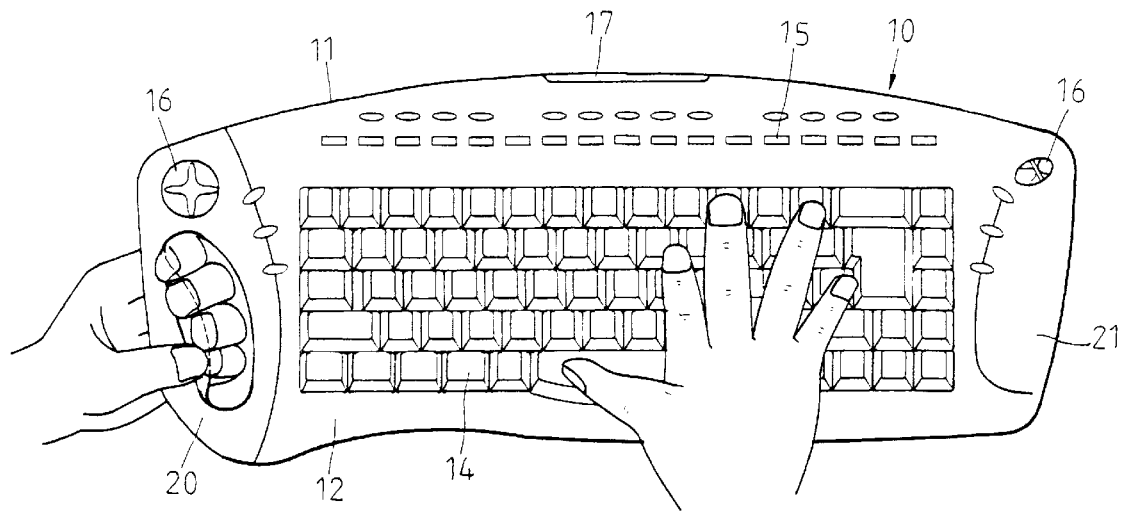
FIG. 4 is an illustration of the handgrip of the subject matter in use.
Figure 6:
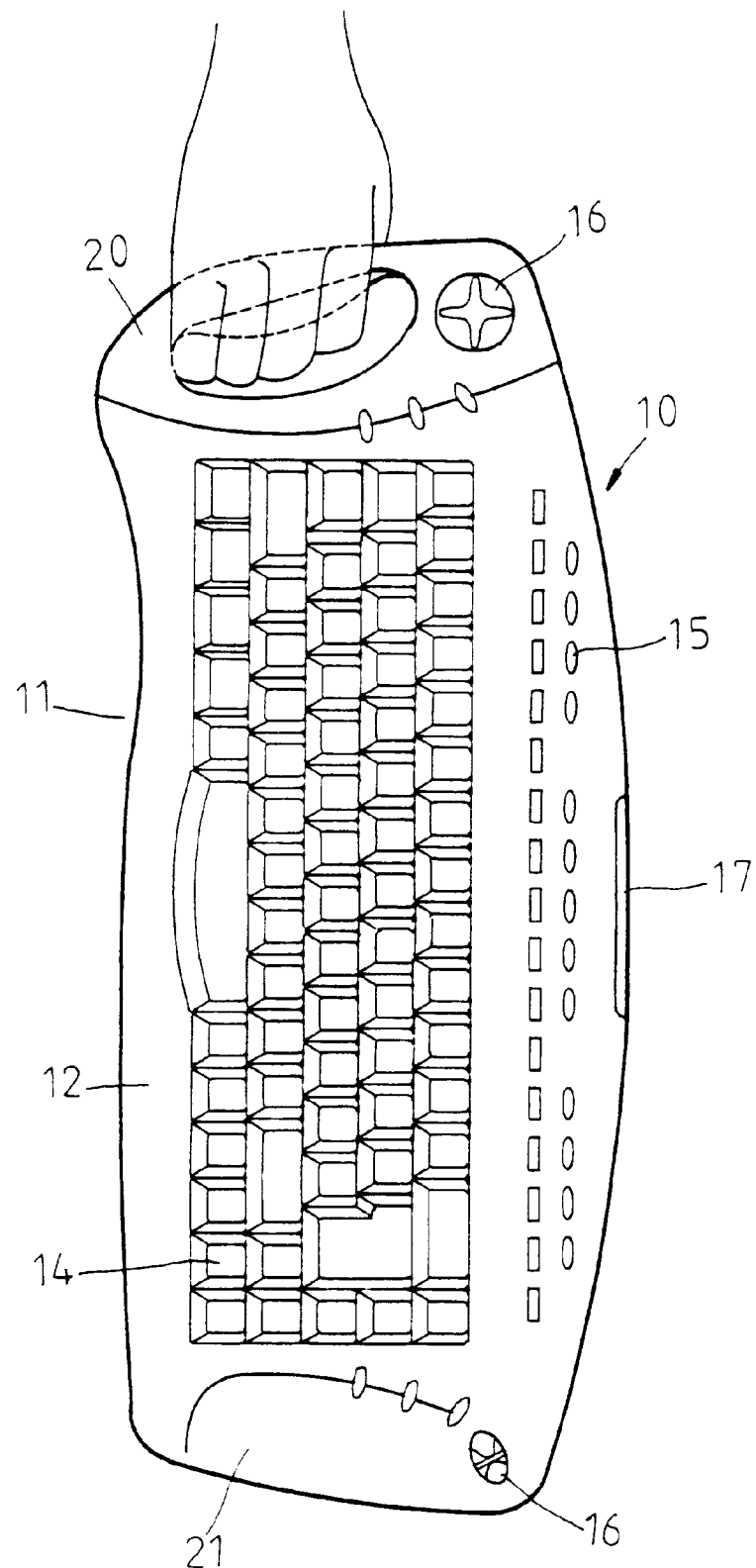
FIG. 6 is an illustration of the subject matter in a portable status.
Figure 7:
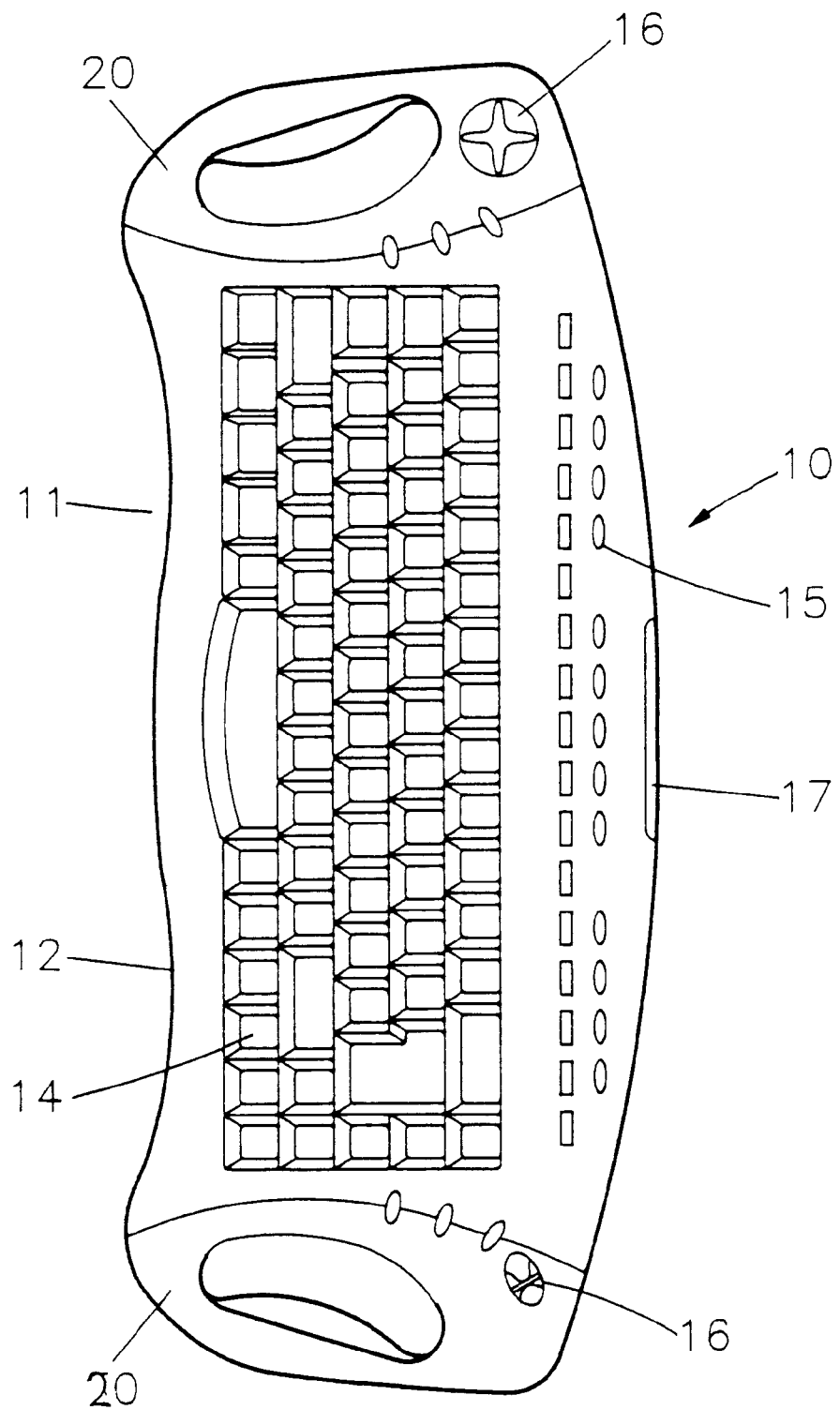
FIG. 7 is a plan view of another embodiment of the subject matter.

Furthermore, on one side (either left or right) or two sides (as shown in FIG. 7) of the casing 11 of the subject matter there may be the equipment of a handgrip 20, said handgrip 20 may be gripped by the user in operation (as shown in FIG. 4), said handgrip 20 will enable carrying of the keyboard (as shown in FIG. 6), in case the handgrip 20 is designed at only one side of the casing 11, there can be a gripping depression 21 to be designed at the top of the other side of the casing 11, with the design of the arc of said gripping depression based on human ergonomics, so that the user may have a firm grip to facilitate operation.

Figure 5:
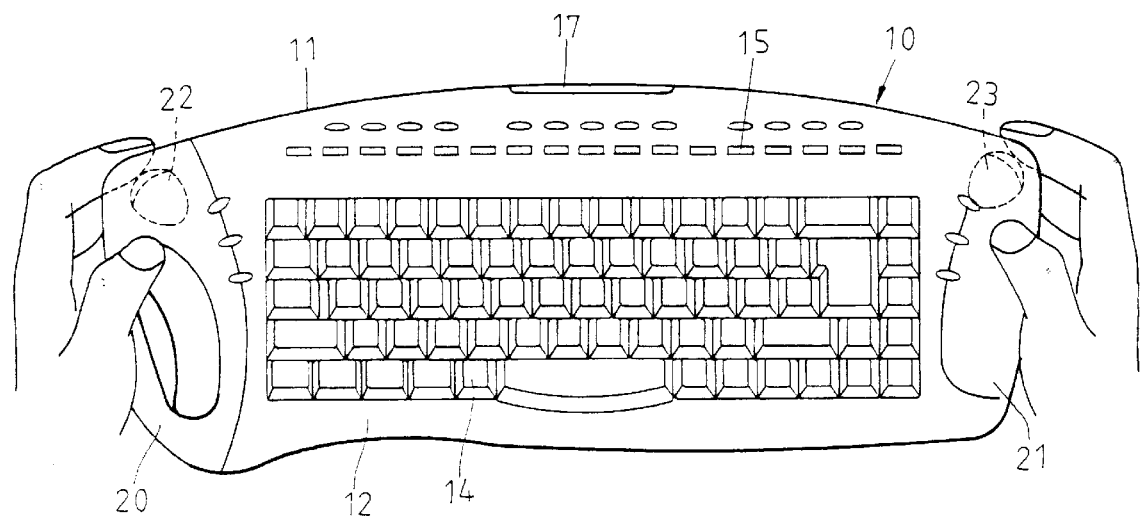
FIG. 5 is an illustration of the keys at the bottom of two sides of the casing of the subject matter when they are in application.

Moreover, there can be press keys 22, 23 (as shown in FIG. 5) at somewhere at the rear edge on the bottom at the left and right sides of the casing 11, so that the user may hold the handgrip 20 and the gripping depression 21 at the left and right sides of the casing in his two hands, in order to press said two keys 22 and 23 easily with his index finger or middle finger.

Summing up, the subject matter with such improvement on the shortcomings of conventional multimedia keyboards such as inability to be placed on a user's lap, inconvenience in handheld operation, inability to press the keys with his index finger or middle finger while the user is holding the keyboard, etc., is a novel creation with its novelty and originality that will fully satisfy the qualifications for a patent right, hence this application is filed in accordance with the Patent Law to protect the subject inventor's rights and interests. Your favorable consideration shall be appreciated.

It is declared hereby that the above description, covering only the preferred embodiment of the subject matter, should not be based to limit or restrict the subject claim, and that all equivalent structural and/or configurational variations and/or modifications easily conceivable to anyone skilled in the subject art, and deriving from the subject description with drawings herein shall reasonably be included in the intent of the subject claim.

I claim:

1. A multimedia keyboard device, comprising a housing formed by an upper casing and a lower casing and having a plurality of keyboard keys thereon, said lower casing having a pair of depressions formed therein with a separating unit therebetween for interface with a user's knees to support said keyboard device on a user's lap, said upper casing having a depression formed in one end thereof to facilitate a user's grip of a first end of said housing, said housing having an opening formed therethrough adjacent a second end thereof to integrally form a handle, said handle being defined by a portion of said housing extending from said opening to said second end of said housing, said upper casing carrying a pair of game rods disposed adjacent said first and second ends of said housing, said housing includes a pair of press keys disposed on said lower casing adjacent said first and second ends thereof and positioned for operation by one of a user's index finger or middle finger of each of a user's hands while a user's hands respectively grasp said depression and said handle.

* * * * *